United States Patent Office 2,914,547
Patented Nov. 24, 1959

2,914,547
ARYLDITHIOCARBAZIC ACID DERIVATIVES

Van R. Gaertner, Dayton, Ohio, assignor to Monsanto Chemical Company, St. Louis, Mo., a corporation of Delaware No Drawing. Application February 24, 1955
Serial No. 490,407

11 Claims. (Cl. 260—429.9)

This invention relates to biological toxicants, and more particularly provides new and valuable derivatives of 3-aryldithiocarbazic acid, methods of preparing the same, and biological toxicants comprising said derivatives.

According to the invention, there are prepared 3-aryldithiocarbazic acid derivatives of the formula $$ArNHNH\overset{\overset{S}{\|}}{C}-ST$$

in which T is selected from the group consisting of heavy metals; radicals of the formula

—R—X in which R is a bivalent hydrocarbon radical of from 3 to 10 carbon atoms containing non-benzenoid unsaturation, and X is selected from H and Cl; and radicals of the formula

—R'—SO$_3$—Y in which R' is a bivalent hydrocarbon radical containing from 3 to 10 carbon atoms, and Y is selected from the group consisting of hydrogen, alkali metal, alkaline earth metal, and ammonium.

3-aryldithiocarbazic acid and its organic base, alkali, or ammonium salts are readily available by the procedure, for example, described by Heller and Bauer in Journal f. praktische Chemie, series 2, volume 65, page 382 (1909). It has now been found that certain new derivatives of this acid can be prepared which possess surprisingly potent biological toxicity.

3-aryldithiocarbazic acids which are useful in preparing the compounds of the invention include, for example, 3-phenyldithiocarbazic acid, 3-(2-naphthyl)dithiocarbazic acid, 3-(o-, m-, and p-tolyl)dithiocarbazic acid, etc., and derivatives of these compounds, such as 3-(p-chlorophenyl)dithiocarbazic acid, 3-(o-, m-, and p-nitrophenyl)-dithiocarbazic acid, 3-(2,4-dinitrophenyl)dithiocarbazic acid, etc. Salts of these acids are particularly useful in synthesis of the compounds of the invention; readily available and useful are, e.g., the ammonium and alkali salts of the acids listed above, such as ammonium or potassium 3-phenyldithiocarbazate, 3-(2-naphthyl)dithiocarbazate, 3-(m-tolyl)dithiocarbazate, etc.

In one aspect of this invention, for example, a 3-aryldithiocarbazic acid, conveniently, in the form of its alkali salt, is reacted with a monohalo-olefinic or monohalo-acetylenic compound, as represented, for example, by the following equation showing the reaction as exemplified by 3-chloropropene and potassium 3-phenyldithiocarbazate.

PhNHNHCS$_2$K + CH$_2$=CHCH$_2$Cl
→ PhNHNHCS$_2$CH$_2$CH=CH$_2$

By this method of condensing an olefinic monohalide with an aryldithiocarbazic acid may be obtained, for example, allyl 3-phenyldithiocarbazate, propenyl 3-phenyldithiocarbazate, isopropenyl 3-phenyldithiocarbazate, 1-methylpropenyl 3-phenyldithiocarbazate, 2-methylpropenyl 3-phenyldithiocarbazate, 1-methylallyl 3-phenyldithiocarbazate, 2-methylallyl 3-phenyldithiocarbazate, 2-methyl-2-pentenyl 3-phenyldithiocarbazate, 2-butenyl 3-phenyldithiocarbazate, 3-butenyl 3-phenyldithiocarbazate, 3-pentenyl 3-phenyldithiocarbazate, 4-pentenyl 3-phenyldithiocarbazate, 2-methyl-3-butenyl 3-phenyldithiocarbazate, cinnamyl 3-phenyldithiocarbazate, allyl 3-(2-naphthyl)dithiocarbazate, 1-methylallyl 3-(2-naphthyl)dithiocarbazate, 2-butenyl 3-(2-naphthyl)dithiocarbazate, cinnamyl 3-(2-naphthyl)dithiocarbazate, allyl 3-(m-tolyl)dithiocarbazate, propenyl 3-(m-tolyl)dithiocarbazate, 1-methylallyl 3-(m-tolyl)dithiocarbazate, 3-butenyl 3-(m-tolyl)dithiocarbazate, cinnamyl 3-(m-tolyl)dithiocarbazate, etc. By condensing an aryldithiocarbazic acid with an acetylenic halide, similarly, acetylenic esters of 3-aryldithiocarbazic acids are prepared, e.g., propargyl 3-phenyldithiocarbazate, 3-butynyl 3-phenyldithiocarbazate, propargyl 3-(2-naphthyl)dithiocarbazate, propargyl 3-(m-tolyl)dithiocarbazate, 3-butynyl 3-(m-tolyl)dithiocarbabate, etc.

A second group of the compounds of this invention is prepared by condensing a 3-aryldithiocarbazic acid with an olefinic dihalide, to give halo-olefin esters of the dithiocarbazic acids. Thus, for example, there are prepared 3-chloro-2-propenyl 3-phenyldithiocarbazate, 3-bromo-2-propenyl 3-phenyldithiocarbazate, 4-chloro-3-butenyl 3-phenyldithiocarbazate, 4-chloro-3-pentenyl 3-phenyldithiocarbazate, 4-chloro-2-methyl-3-butenyl 3-phenyldithiocarbazate, 3-chloro-2-propenyl 3-(2-naphthyl)dithiocarbazate, 4-chloro-2-butenyl 3-(2-naphthyl)dithiocarbazate, 3-chloro-2-propenyl 3-(m-tolyl)dithiocarbazate, 6-chloro-4-hexenyl 3-(m-tolyl)dithiocarbazate, etc. In addition to the illustrative olefinic compounds listed above, there may similarly be prepared chloroacetylenic esters, e.g., 4-chloro-2-butynyl 3-phenyldithiocarbazate, 4-chloro-2-butynyl 3-(2-naphthyl)dithiocarbazate, 4-chloro-2-heptynyl 3-phenyldithiocarbazate, 4-chloro-2-heptynyl 3-(m-tolyl)dithiocarbazate, etc.

A further group of new and useful aryldithiocarbazates prepared in accordance with this invention comprises the products of reaction of alkanesultones with aryldithiocarbazates to give salts of sulfoalkyl esters of aryldithiocarbazates as illustrated by the following equation:

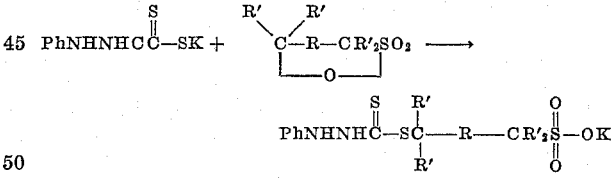

in which R represents a branched or unbranched bivalent alkylene radical of from 1 to 5 carbon atoms, and R' is selected from H and lower alkyl radicals.

The alkanesultones employed for the production of the present sulfoalkyl 3-aryldithiocarbazates are readily available materials which may be prepared in good yields, by sulfochlorination of certain alkyl chlorides to yield chloroalkanesulfonyl chlorides, hydrolysis of the acid halides to the corresponding sulfonic acids, and ring closure of the latter with loss of HCl. Sultones are preferably named as derivatives of the corresponding hydroxyalkanesulfonic acid. Thus, for example, one sultone which is useful for the present purpose may be called the sultone of 3-hydroxy-1-propanesulfonic acid

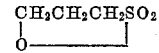

Similarly useful products, obtainable via the sulfochlorination process described above, which may be reacted to produce the compounds of this invention, are the sultones of 4-hydroxy-1-butanesulfonic acid, of 3-hydroxy-3- methyl-1-propanesulfonic acid, of 3-hydroxy-1-methyl-1-propanesulfonic acid, of 3-hydroxy-2-methyl-1-propanesulfonic acid, of 5-hydroxy-1-pentanesulfonic acid, of 4-hydroxy-4-methyl-1-butanesulfonic acid, of 4-hydroxy-3-methyl-1-butanesulfonic acid, of 4-hydroxy-2-methyl-1-butanesulfonic acid, of 4-hydroxy-1-methyl-1-butanesulfonic acid, of 3-hydroxy-1-pentanesulfonic acid, of 3-hydroxy-1-methyl-1-butanesulfonic acid, of o-(hydroxymethyl)benzenesulfonic acid, of 3-hydroxy-2-methyl-3-phenyl-1-propanesulfonic acid, etc.

A class of particularly valuable sulfoalkyl aryldithiocarbazates, esters, and salts provided by the present invention comprise those wherein the alkyl radical has from 3 to 10 carbon atoms. Examples of this class are the 3-sulfopropyl ester of 3-phenyldithiocarbazic acid and the potassium, sodium and ammonium salts of this acid, 4-sulfobutyl 3-phenyldithiocarbazate and its ammonium and alkali metal salts, 3-sulfobutyl 3-phenyldithiocarbazate and its ammonium and alkali metal salts, 1-methyl-3-sulfopropyl 3-phenyldithiocarbazate and its sodium, potassium and ammonium salts, 2-methyl-3-sulfopropyl 3-(2-naphthyl)dithiocarbazate and its ammonium and alkali metal salts, 5-sulfoamyl 3-(m-tolyl)dithiocarbazate and its sodium, potassium and ammonium salts, potassium sulfohexyl 3-phenyldithiocarbazate, etc.

In preparing the compounds of the invention as described above, I may use the 3-aryldithiocarbazic acid in the form of the free acid or in the form of one of its salts. 3-aryldithiocarbazic acids are conveniently prepared and isolated as their salts, either with organic bases, or as the alkali metal or ammonium salts. A particularly convenient form of 3-aryldithiocarbazic acids to prepare is the alkali metal salts, e.g., the potassium salts. While the free acid would react equally well in the reactions described above, it is convenient to use the salt directly in further reactions, both to avoid an extra step in isolating the free acid, and to avoid the undesirable evolution of HCl in subsequent reactions with, e.g., olefinic halides and dihalides.

While condensation of the 3-aryldithiocarbazate salt with olefinic halides, dihalides and sultones can be effected either in the presence or the absence of an inert solvent or diluent, the condensations of these compounds are conveniently carried out in liquids in which the reactants are soluble. Aqueous solutions are usually convenient for dissolving and ionizing the salts of the 3-aryldithiocarbazic acids; other polar solvents, such as ethyl alcohol, isopropanol, etc., or inert hydrocarbons such as benzene, toluene, hexane, etc., may also be used as solvents and/or diluents for the reactants; a mixed aqueous and organic solvent and/or diluent reaction medium may also be found convenient in some cases.

As indicated by the equations given above, one molecular proportion of the 3-aryldithiocarbazic acid is required for each molecular proportion of olefinic halide, dihalide, or sultone. Substantially molecular equivalents of each reactant are therefore preferably employed, though an excess of either of the reactants may be used if desired. Generally, a convenient procedure may be to add one reactant slowly to an excess of the other. The temperature and pressure conditions under which the reactions of this invention take place can be varied widely; however, satisfactory yields are usually obtained at atmospheric pressure. Temperatures from as low as −10° or below, up to as high as 150° C. and above, are operative, depending on the reactants; however, since the reactions are usually exothermic, and since the dithiocarbazates tend to be unstable at high temperatures, it is convenient to carry out the reactions at room temperature or below, subsequently heating the reaction mixture to reflux temperature, if desired, to drive the reaction further towards completion. Catalysts may be used, if desired; however, these reactions generally proceed with sufficient rapidity so as not to require the use of catalysts. The reaction products are readily isolated by suitable procedures, i.e., filtration, distillation, etc.

A further class of new and useful 3-aryldithiocarbazic acid derivatives provided by this invention comprises the heavy metal salts of the aryldithiocarbazates. The heavy metals are those which are listed in the lower half of the standard periodic table and which have a specific gravity greater than 4. Examples of heavy metals useful in preparing the biological toxicant compositions of this invention are, e.g., copper, mercury, zinc, silver, lead, etc. The heavy metal salts of the present invention are prepared, e.g., by metathesis between the alkali metal salts of 3-aryldithiocarbazic acids and inorganic salts of these heavy metals in aqueous solution at room temperature or below. By this method are prepared, e.g., salts of monovalent metals such as silver 3-phenyldithiocarbazate, mercury (I) 3-phenyldithiocarbazate, mercury (I) 3-(m-tolyl)dithiocarbazate, silver 3-(2-naphthyl)dithiocarbazate, etc., as well as salts of divalent heavy metals such as zinc bis-(3-phenyldithiocarbazate), cupric bis-3-(phenyldithiocarbazate), zinc bis-(3-m-tolyldithiocarbazate), zinc bis-(3-p-chlorophenyldithiocarbazate), etc.

The 3-aryldithiocarbazates of this invention are useful for a variety of industrial and agricultural purposes. The sulfoalkane 3-aryldithiocarbazates, are useful, for example, as rubber vulcanization accelerators, as lubricant additives, and as surface-active agents. The olefin and halo-olefin esters may be used, e.g., in the preparation of polymers. The heavy metal salts have utility as blowing agents in the preparation of sponge from rubber. In addition, the 3-aryldithiocarbazates of this invention possess particular utility as biological toxicants, having specially outstanding activity, e.g., as fungicides.

The invention is further illustrated, but not limited by the following examples:

*Example 1*

A mixture of 54 g. (0.5 mole) of phenylhydrazine with 28 g. potassium hydroxide in 280 g. ethyl alcohol was prepared and cooled to below 5° C., whereupon 38 g. (0.5 mole) of carbon disulfide was added dropwise during 40 minutes. After standing overnight at below 10° C., the reaction product, potassium 3-phenyldithiocarbazate, was obtained in the form of a crystalline slurry, completely soluble in water.

*Example 2*

Forty g. of the product of Example 1, calculated equal to 0.05 mole potassium 3-phenyldithiocarbazate, was mixed with 14.4 g. (0.05 mole) zinc sulfate in approximately 150 ml. water and 50 ml. ice. The mixture was stirred, filtered, washed thoroughly with water, and dried, giving 9.6 g. of a cream-colored powder, which decomposed with blackening and evolution of gas at 134–136° C. Analysis of the product indicated it was the desired zinc bis-(3-phenyldithiocarbazate); 89 percent yield.

*Example 3*

Cupric bis(3-phenyldithiocarbazate) was prepared similarly to Example 2, using 40 g. of the product of Example 1 and 12.5 g. cupric sulfate monohydrate. There were obtained 10.8 g. (100 percent theoretical yield) of the cupric salt, which is a tan powder, darkening at 134° C., and blackening with evolution of gas at 140–145° C.

*Example 4*

A mixture of 14.0 g. mercuric sulfate was stirred in water and ice for one hour with 40 g. of the product of Example 1, giving 19.0 g. (93.6 percent yield) of mercury phenyldithiocarbazate, tan powder, melting with decomposition at 115–20° C.

*Example 5*

To isolate the potassium salt of 3-phenyldithiocarbazic acid, 40 g. of the product of Example 1 was filtered, washed with ethyl alcohol and dried, giving 9.9 g. of the potassium salt.

Example 6

To 80 g. (0.1 mole) of the reaction product of Example 1, at a temperature of 25° C., there were added dropwise 7.7 g. (0.1 mole) 3-chloropropene in 40 ml. ethyl alcohol. A slight evolution of heat (rise to 27° C.) was apparent. After standing overnight, the mixture was refluxed for one hour, and then cooled to room temperature and covered with 400 ml. water. The dark oil which separated was extracted with ether, and the ether solution was washed with water and dried with sodium sulfate. After removal of the ether, 15.8 g. (70.5 percent yield) of liquid allyl 3-phenyldithiocarbazate were obtained.

Example 7

During dropwise addition of 11.1 g. (0.1 mole) of 1,3-dichloro-2-propene during 5 minutes to 80 g. (0.1 mole) of the product of Example 1, and 30 minutes subsequent stirring, the reaction mixture temperature rose from 23° C. to 33° C. After standing overnight, the mixture was heated and then refluxed for an hour. After cooling in ice and addition of 400 ml. water to the reaction mixture, a grey solid precipitated. The solid was filtered off, washed with water, and then recrystallized from water and ethanol, giving 23.8 g. (92 percent yield) 3-chloro-2-propenyl 3-phenyldithiocarbazate, M.P. 102–106° C.

Example 8

Another quantity of the potassium 3-phenyldithiocarbazate of Example 1 was freshly prepared, and to 24 g. of the product slurry (0.03 mole), there was added dropwise, with cooling to about 0° C. and stirring, 4.1 g. (0.336 mole) of propanesultone dissolved in 10 ml. of benzene. The appearance of a solid reaction product was noted even during the reaction. Thirty ml. of cold ethyl alcohol were added to the reaction mixture, which was then stirred for one hour while it warmed to room temperature. The product was removed by filtration and dried at 55° C., giving 8.2 g. of potassium 3-sulfopropyl 3-phenyldithiocarbazate.

The compounds of the invention were tested for effectiveness as wheat rust eradicants as follows:

Example 9

Five uniform, 6-day-old seedlings of a rust-susceptible variety of wheat (Seneca) were sprayed with water by means of an atomizer. The individual leaves were then gently rubbed between the thumb and index finger to remove the "bloom" and then inoculated with *Puccinia rubigo-vera tritici* by gently scraping up and down the back sides of the rubbed leaves a scalpel which had been water-wetted and loaded with spores of the organism. Following inoculation, the plants wree sprayed with a fine mist of water and maintained for 48 hours in an incubation chamber at a temperature of 70° F. and a humidity of 100°. They were then transferred to the greenhouse benches, where they were kept for another 48 hours.

At the end of that time, they were sprayed with an emulsion prepared by adding 100 mg. of the allyl 3-phenyldithiocarbazate of Example 6 to 5 ml. of acetone, and then introducing to the resulting solution approximately 0.1 ml. of an emulsifying agent known to the trade as "Tween 20" and reputed to be a polyoxy-ethylene sorbitan monolaurate. The whole was then diluted with 5 ml. of water to give an emulsion containing 1 percent by weight of the allyl ester. For the instant test, the 1 percent emulsion was further diluted with water to give an emulsion containing 0.25 percent by weight of the ester.

Spraying of the plants with the allyl ester was effected by means of an atomizer, 5 ml. of the suspension being applied to the pot of five plants. The sprayed plants were then returned to the greenhouse and held there for a week. Observation of the plants at the end of that time disclosed that the plants which had been sprayed with the 0.25 percent emulsion of allyl 3-phenyldithiocarbazate were entirely free of rust pustules. Similarly inoculated but unsprayed plants which had been maintained in the incubator and greenhouse for the same length of time were found to be badly infected with rust.

Example 10

In this example, the 3-chloro-2-propenyl 3-phenyldithiocarbazate of Example 7 was tested for its wheat rust eradicating activity. Using the testing procedure described in Example 9, complete inhibition of the rust was observed with plants which had been sprayed with an 0.25 percent emulsion of the carbazate.

Example 11

An aqueous suspension of the zinc bis(3-phenyldithiocarbazate) of Example 2 was prepared containing 0.25 percent by weight of the salt. Since the zinc salt is a wettable powder, the addition of the emulsifier of the above examples was omitted in making this suspension. Five ml. of the zinc salt suspension was applied to a pot of five wheat plants, as described in the above examples. Substantial suppression of the wheat rust was observed with the plants treated with the suspension, and there was no phytocidal effect.

Example 12

The mercury 3-phenyldithiocarbazate of Example 4 was tested against rust by the procedure of Example 11. In this case again, the compound was a wettable powder, and was applied as an aqueous suspension of the mercurous salt, at a concentration of 0.25 percent by weight, similarly sprayed into the infected plants. A good degree of suppression of the wheat rust was observed with plants which had been sprayed with the mercurous salt, and there was no evidence of any phytotoxic effect of said suspension.

By contrast, the potassium salt of the same acid, isolated as described in Example 5, and applied like the mercurous salt, gave no control of the rust; the plants treated with a suspension of the potassium salt were as badly infected with rust as those which had received no treatment.

Example 13

Zinc bis(3-phenyldithiocarbazate) was tested against the fungus *Aspergillus niger* using the following testing procedure: A 1 percent stock solution of the salt in a nontoxic solvent was made up and added to a container of sterile, melted Dextrose agar in a quantity to give one part of the salt per 1000 parts of the agar; after thorough mixing, the agar containing the zinc salt was poured into a Petri dish and allowed to harden. One drop of a spore suspension of the fungus was used as an inoculum for the plate, which was incubated at a temperature of 25° C. for five days. At the end of that time, the dish containing the zinc salt showed complete inhibition of the fungus, whereas a blank test specimen, i.e., agar containing none of the zinc salt but similarly inoculated and incubated, showed extensive fungus growth.

Example 14

This example shows testing of zinc bis(3-phenyldithiocarbazate) as a systemic plant fungicide.

A 1 percent emulsion of the zinc salt was prepared by warming 100 ml. of the salt with 1 ml. of the emulsifying agent known to the trade as "Tween 20" and further identified above; to this mixture was added 9 ml. of water to make the said 1 percent emulsion. This stock solution was then made up to 300 ml. of a 100 p.p.m. solution.

The sand in which were potted fifteen plants of four- to five-week old individually potted tomato plants, each having four true leaves (at least 1½ inches long) was sprayed with 30 ml. per pot of the 100 p.p.m. solution of the zinc salt for 30 successive days. On the fourth day, the fifteen plants, plus a control, were uprooted, about ⅓ of their root system torn off, and the roots, after washing in water, immersed in a suspension of approximately 10⁸ bud cells/ml. of a culture of *Fusarium oxysporum f. lycopersici*, for 30 seconds. The plants were repotted in fresh sand and permitted to develop until the control showed marked disease symptoms. Analyses of the results of the tests by evaluation of the vascular discoloration in the large vascular bundles between each node showed that very promising systemic control of Fusarium wilt disease was obtained on the plants treated with the zinc salt, and no phytotoxic activity to the tomato plant had occurred. Repetition of the test using a 10 p.p.m. concentration of the zinc salt again demonstrated systemic activity of the salt.

*Example 15*

The activity of zinc bis(3-phenyldithiocarbazate) as a fungicide is further illustrated by this example:

The zinc salt was suspended in water sufficient to make an 0.1 percent suspension of the salt. In each of two wells of a glass slide were placed 0.02 ml. of the 0.1 percent suspension of the salt, and the suspensions were then evaporated to dryness. Then in one well was placed 0.1 ml. of a suspension of 50,000 spores per ml. of *Stemphylium sarcinaefernil*, and in the other well, 0.1 ml. of a similar concentration of *Monolinia fructicola* spores. The slide was then placed in a Petri dish containing a small amount of water and incubated for 24 hours. Results, calculated as percentage of germinated spores, a spore being considered germinated when the germ tube is at least half the length of the spore, showed that this concentration of zinc bis(3-phenyldithiocarbazate) gave better than 90 percent kill of the Stemphylium spores, and 100 percent kill of the Monilinia.

*Example 16*

The procedure of the above test for spore germination was repeated, using as the active agent the same concentration, 200 p.p.m., of the allyl 3-phenyldithiocarbazate of Example 6. A 100 percent kill of the Monilinia spores was observed.

*Example 17*

The 3-chloro-2-propenyl 3-phenyldithiocarbazate of Example 7, tested similarly, also gave 100 percent kill of Monilinia spores.

What is claimed is:

1. An aryldithiocarbazic acid derivative of the formula

in which Ar is an aromatic hydrocarbon radical selected from the class consisting of monocyclic and bicyclic radicals and T is selected from the class consisting of heavy metals; radicals of the formula

—R—X in which R is a bivalent aliphatic hydrocarbon radical of from 3 to 6 carbon atoms containing non-benzenoid unsaturation, and X is selected from the class consisting of H and Cl; and radicals of the formula

—R′—SO₃—Y in which R′ is a saturated bivalent aliphatic hydrocarbon radical of from 3 to 4 carbon atoms and Y is selected from the class consisting of hydrogen, alkali metals, alkaline earth metals and ammonium.

2. Heavy salts of 3-aryldithiocarbazic acids wherein said aryl groups are hydrocarbon groups selected from the class consisting of monocyclic and bicyclic groups.

3. 3-aryldithiocarbazic acid esters of the general formula

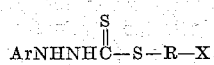

in which Ar is an aromatic hydrocarbon radical, R is an aliphatic hydrocarbon radical of from 3 to 6 carbon atoms containing non-benzenoid unsaturation and X is selected from H and Cl.

4. Sulfoalkyl esters of 3-aryldithiocarbazic acids of the general formula

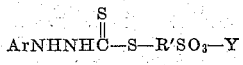

in which Ar is an aromatic hydrocarbon radical selected from the class consisting of monocyclic and bicyclic radicals, R′ is a bivalent aliphatic hydrocarbon radical containing from 3 to 4 carbon atoms, and Y is selected from the group consisting of hydrogen, alkali metal, alkaline earth metal and ammonium.

5. Zinc bis(3-phenyldithiocarbazate).
6. Allyl 3-phenyldithiocarbazate.
7. 3-chloro-2-propenyl 3-phenyldithiocarbazate.
8. Potassium 3-sulfopropyl 3-phenyldithiocarbazate.
9. The process which comprises contacting a member of the class consisting of 3-aryldithiocarbazic acids and their salts with an alkane sultone containing from 3 to 4 carbon atoms, and recovering from the reaction product a compound of the formula

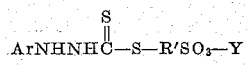

in which Ar is an aromatic hydrocarbon radical selected from the class consisting of monocyclic and bicyclic radicals, R′ is a saturated bivalent aliphatic hydrocarbon radical of from 3 to 4 carbon atoms, and Y is selected from the group consisting of hydrogen, alkali metal, alkaline earth metal, and ammonium.

10. The process of claim 9, wherein Ar is the phenyl radical and Y is an alkali metal.

11. The process which comprises contacting potassium 3-phenyldithiocarbazate with propane sultone, and recovering from the reaction product potassium 3-sulfopropyl 3-phenyldithiocarbazate.

References Cited in the file of this patent

UNITED STATES PATENTS

| Re. 22,750 | Tisdale et al. | Apr. 30, 1946 |
|---|---|---|
| 1,994,002 | Mills | Mar. 12, 1935 |
| 2,069,165 | Kharasch | Jan. 26, 1937 |
| 2,390,037 | Nolan | Nov. 27, 1945 |
| 2,481,438 | Mowery | Sept. 6, 1949 |
| 2,623,059 | Mathes | Dec. 23, 1952 |

OTHER REFERENCES

Busch: J. Prakt. Chem. 168, 219–225 (1899).
Sayre: J.A.C.S. 74, 3647–3649 (1952).
Scott et al.: J. Org. Chem. 19, 742–748 (1954).

UNITED STATES PATENT OFFICE
CERTIFICATE OF CORRECTION

Patent No. 2,914,547                                November 24, 1959

Van R. Gaertner

It is hereby certified that error appears in the printed specification of the above numbered patent requiring correction and that the said Letters Patent should read as corrected below.

Column 2, lines 43 to 45, the left-hand portion of the formula should appear as shown below instead of as in the patent

column 5, line 54, for "wree" read -- were --; column 8, line 3, after "Heavy" insert -- metal --.

Signed and sealed this 31st day of May 1960.

(SEAL)
Attest:
KARL H. AXLINE                                        ROBERT C. WATSON

Attesting Officer                                    Commissioner of Patents